(12) United States Patent
Hirao et al.

(10) Patent No.: US 9,945,469 B2
(45) Date of Patent: Apr. 17, 2018

(54) STRAIGHT BEVEL GEAR WITH SPHERICAL INVOLUTE CONFIGURATION

(71) Applicant: ArvinMeritor Technology, LLC, Troy, MI (US)

(72) Inventors: Wagner Hirao, Rochester Hills, MI (US); Silvio Masaaki Yamada, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/399,890

(22) Filed: Jan. 6, 2017

(65) Prior Publication Data

US 2017/0114882 A1    Apr. 27, 2017

Related U.S. Application Data

(62) Division of application No. 14/458,499, filed on Aug. 13, 2014, now Pat. No. 9,568,085.

(51) Int. Cl.
| | |
|---|---|
| *F16H 55/08* | (2006.01) |
| *F16H 55/22* | (2006.01) |
| *F16H 55/17* | (2006.01) |

(52) U.S. Cl.
CPC ......... *F16H 55/0813* (2013.01); *F16H 55/17* (2013.01); *F16H 55/22* (2013.01)

(58) Field of Classification Search
CPC .. F16H 55/08; F16H 55/0806; F16H 55/0813; F16H 55/0846; F16H 2055/0866; F16H 55/17; F16H 55/22

USPC ................................................ 74/457, 459.5
See application file for complete search history.

(56) References Cited

U.S. PATENT DOCUMENTS

| | | | |
|---|---|---|---|
| 3,605,518 A | 9/1971 | Haller | |
| 3,703,108 A | 11/1972 | McCaw | |
| 4,308,760 A | 1/1982 | Voigtlaender et al. | |
| 6,324,931 B1 | 12/2001 | Tsung | |
| 7,827,692 B2 * | 11/2010 | Geiman | B21K 1/30 29/893 |
| 7,950,305 B2 | 5/2011 | Gutmann et al. | |
| 2009/0064812 A1 | 3/2009 | Gutmann et al. | |
| 2012/0048048 A1 | 3/2012 | Benedict et al. | |

FOREIGN PATENT DOCUMENTS

| | | |
|---|---|---|
| CN | 101391323 A | 3/2009 |
| CN | 101410656 A | 4/2009 |

(Continued)

OTHER PUBLICATIONS

State Intellectual Property Office of China, First Office Action for the corresponding Chinese Patent Application No. 201510124576.3 dated May 3, 2017.

(Continued)

*Primary Examiner* — David M Fenstermacher
*Assistant Examiner* — Bobby Rushing, Jr.
(74) *Attorney, Agent, or Firm* — Brooks Kushman P.C.

(57) ABSTRACT

A straight bevel gear having a gear body that includes a first set of gear teeth and at least one web. The set of gear teeth may have a spherical involute configuration. The web may extend between adjacent members of the set of gear teeth such that the web may be completely and continuously curved in multiple directions.

10 Claims, 5 Drawing Sheets

(56) References Cited

FOREIGN PATENT DOCUMENTS

DE 301921 C 2/1971
EP 0017065 A1 10/1980

OTHER PUBLICATIONS

European Patent Office, Extended European Search Report for the corresponding European Patent Application No. 15170071.3 dated Apr. 11, 2016.
H. Ligata and H.H. Zhang, International Journal of Industrial Engineering & Production Research, "Geometry Definition and Contact Analysis of Spherical Involute Straight Bevel Gears," Jun. 2012, vol. 23, No. 2, pp. 101-111.

* cited by examiner

STRAIGHT BEVEL GEAR WITH SPHERICAL INVOLUTE CONFIGURATION

CROSS-REFERENCE TO RELATED APPLICATIONS

This application is a division of U.S. application Ser. No. 14/458,499, filed Aug. 13, 2014, now U.S. Pat. No. 9,568,085, the disclosure of which is hereby incorporated in its entirety by reference herein.

TECHNICAL FIELD

This patent application relates to a straight bevel gear having gear teeth that have a spherical involute configuration.

BACKGROUND

A machining method for a spherical involute toothed oblique straight bevel gear made by taped teeth is disclosed in Chinese Patent No. 101391323.

SUMMARY

In at least one embodiment, a straight bevel gear is provided. The straight bevel gear may have a gear body that may include a hole, a set of gear teeth, and a first web. The hole may be disposed along an axis. The set of gear teeth may be arranged around the hole. Members of the set of gear teeth may be provided with a spherical involute configuration. The first web may be disposed between the hole and an outside diameter of the set of gear teeth. The first web may extend between two adjacent members of the set of gear teeth such that the first web is completely curved in a plane that includes the axis and that bisects a gap between the two adjacent members of the set of gear teeth.

In at least one embodiment, a straight bevel gear is provided. The straight bevel gear may include a gear body that may include a hole, a set of gear teeth, a first web, and a second web. The hole may be disposed along an axis. The set of gear teeth may be arranged around the hole. The members of the set of gear teeth may be provided with a spherical involute configuration. The first web may be disposed between the hole and an outside diameter of the set of gear teeth. The first web may extend between two adjacent members of the set of gear teeth such that the first web is completely curved in a plane that includes the axis and that bisects a gap this is disposed between two adjacent members of the set of gear teeth. The second web may be disposed proximate the outside diameter. The second web may extend between the two adjacent members of the set of gear teeth such that the second web is completely curved in the plane.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
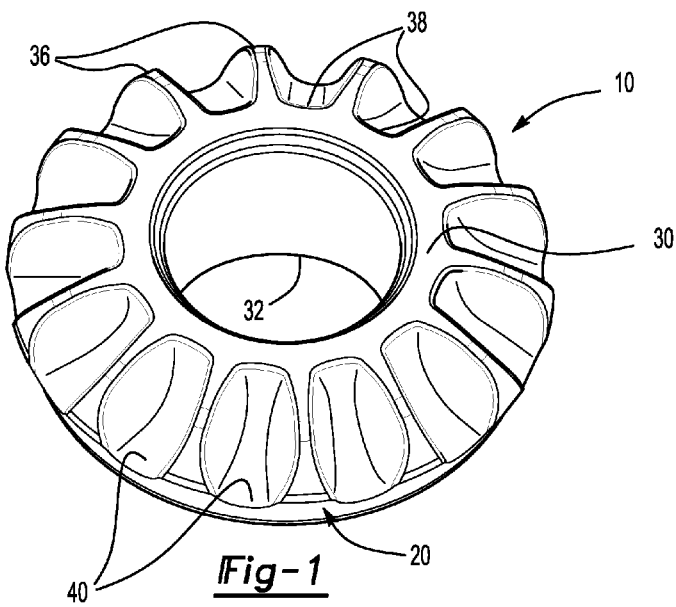
FIG. 1 is a perspective view of a first straight bevel gear.
Figure 2:
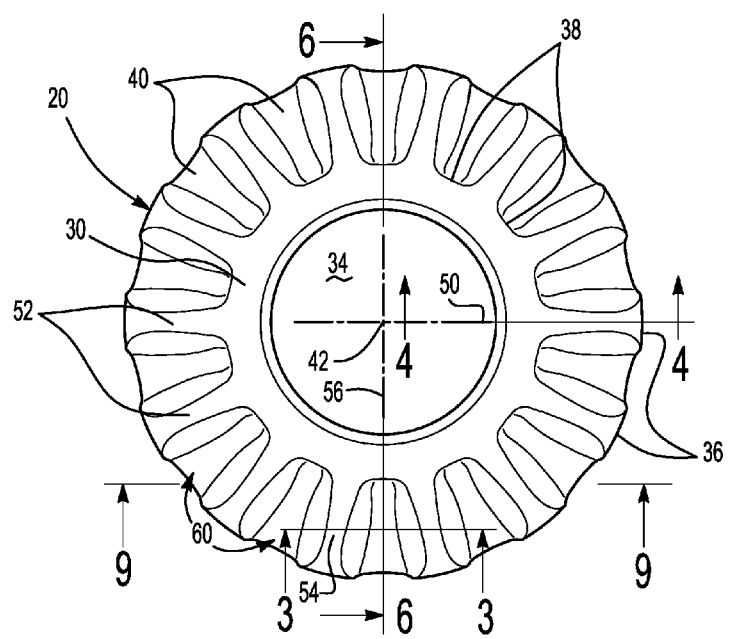
FIG. 2 is a top view of the straight bevel gear of FIG. 1.
Figure 10:
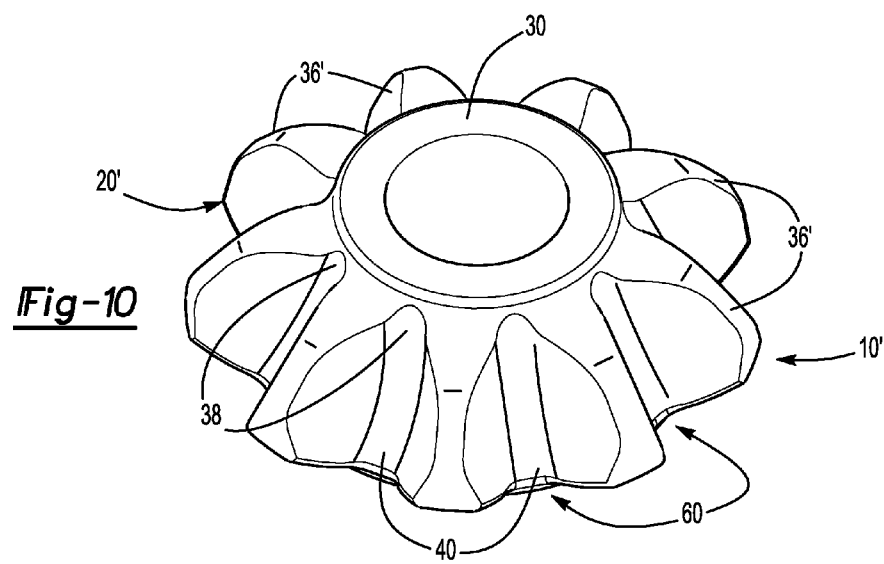
FIG. 10 is a perspective view of another embodiment of a straight bevel gear.

Referring to FIG. 1, an example of a straight bevel gear 10 is shown. The straight bevel gear 10 may be configured for use with a vehicle, such as a motor vehicle like a truck, bus, farm equipment, military transport or weaponry vehicle, or cargo loading equipment for land, air, or marine vessels. For example, the straight bevel gear 10 may be part of a wheel hub assembly or a drivetrain component like a transfer case, differential, or interaxle differential unit that may compensate for speed differences between different axle shafts or axle assemblies. In FIG. 1, the straight bevel gear 10 is configured as a side bevel gear, such as may be provided with a differential or interaxle differential unit. In FIG. 10, the straight bevel gear 10 is configured as a pinion bevel gear. The combination of a side bevel gear and a pinion bevel gear may be used to connect two rotatable shafts that may be disposed along intersecting axes of rotation in any given speed ratio by meshing of the gear teeth of the gears.

Referring to FIGS. 1-4, a first embodiment of a straight bevel gear 10 is shown. The straight bevel gear 10 may include a gear body 20. The gear body 20 may have a unitary or one-piece construction and may be made of any suitable material, such as a metal alloy. The gear body 20 may include a front surface 30, a back surface 32, a hole 34, a set of gear teeth 36, a first web 38, and a second web 40.

The front surface 30 may extend around an axis 42. In at least one embodiment, the front surface 30 may be substantially planar and may be disposed substantially perpendicular to the axis 42. The front surface 30 may extend from the hole 34 to the set of gear teeth 36. Moreover, the front surface 30 may extend around and may at least partially define the hole 34 or an opening of the hole 34.

The back surface 32 may be disposed opposite the front surface 30. As such, the back surface 32 may be spaced apart from the front surface 30. In at least one embodiment, the back surface 32 may be substantially planar and may be disposed substantially perpendicular to the axis 42. The back surface 32 may also be disposed substantially parallel to the front surface 30 in one or more embodiments.

The hole 34 may extend from the front surface 30 to the back surface 32. The hole 34 may extend along and may be centered about the axis 42. As such, an inside diameter of the gear body 20 may at least partially define the hole 34. The hole 34 may be configured to receive another component, such as a shaft that may facilitate rotation of the straight bevel gear 10 about the axis 42. The hole 34 may be spaced apart from the set of gear teeth 36 to help strengthen the straight bevel gear 10 as will be discussed in more detail below.

The set of gear teeth 36 may be arranged around the hole 34. For example, the set of gear teeth 36 may be arranged around the hole 34 such that each gear tooth 36 is centered about and is spaced apart from the hole 34. Each member of the set of gear teeth 36 may have a common or substantially identical configuration. For instance, each gear tooth 36 may extend radially with respect to the axis 42 such that each gear tooth 36 has a straight tooth configuration or is disposed along a tooth axis or tooth bisecting plane 50 that includes the entire axis 42 or multiple points on the axis 42 and that bisects at least one gear tooth 36. More specifically, the members of the set of gear teeth 36 may be straight teeth that may extend radially with respect to the axis 42. As such, the straight teeth are distinguished from spiral teeth, hypoid teeth, or Zerol teeth.

The members of the set of gear teeth 36 may have a spherical involute configuration. A geometrical definition of a spherical involute straight bevel gear is provided in "Geometry Definition and Contact Analysis of Spherical Involute Straight Bevel Gears" by H. Ligata and H. H. Zhang, published June 2012 in volume 23, number 2 of the *International Journal of Industrial Engineering and Production Research*, which is hereby incorporated by reference in its entirety.

Figure 13:
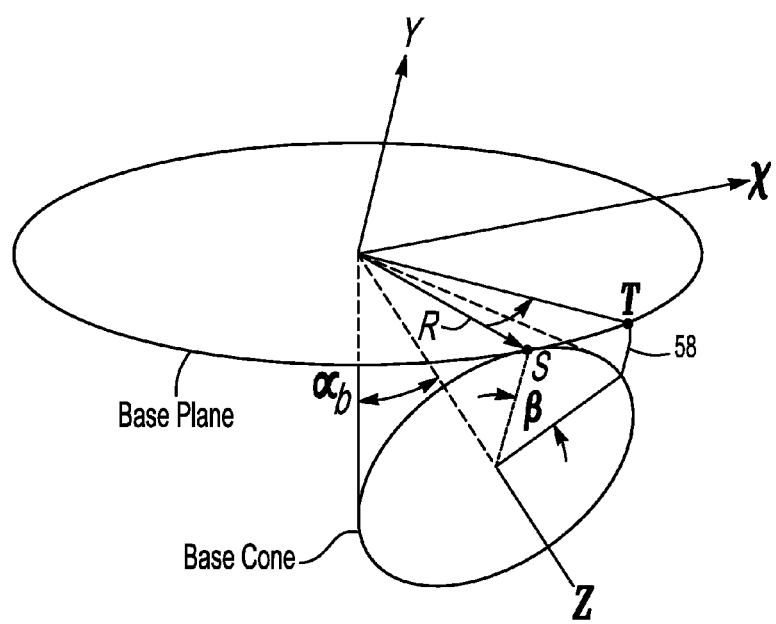
FIG. 13 is a schematic illustration of parameters associated with creating a spherical involute gear tooth configuration.

In summary, the general equation of a spherical involute surface can be obtained by translating the position of a point T (shown in FIG. 13) that is disposed on a base plane that is tangent to a base cone and that rolls over a base cone without slipping (i.e., pure rolling). The trajectory or spherical involute of the point T can be generally visualized as being similar to unwrapping a cone. The coordinates of the trajectory of point T can be expressed as:

$$x = R\cos(\beta\sin(\alpha_b))\sin(\alpha_b)\cos(\beta) + R\sin(\beta\sin(\alpha_b))\sin(\beta)$$

$$y = R\cos(\beta\sin(\alpha_b))\sin(\alpha_b)\sin(\beta) - R\sin(\beta\sin(\alpha_b))\cos(\beta)$$

$$z = R\cos(\beta\sin(\alpha_b))\cos(\alpha_b)$$

where:

R is the distance along the base cone or radius of a base plane that is tangent to the base cone, $\alpha_b$ is the base cone angle, and $\beta$ is the roll angle through which base cone rotates during pure rolling motion.

A complete spherical involute surface can be obtained by varying parameters R and $\beta$. R may be varied between inner and outer cone distances that may be obtained in the design stage while $\beta$ may be varied over a range that covers a portion of the gear tooth from proximate the root to the tip. The base cone angle ($\alpha_b$) may be determined by using a pitch angle ($\alpha_p$) and a pressure angle ($\phi$) in the expression:

$$\sin(\alpha_b) = \sin(\alpha_p)\cos(\phi)$$

The pitch angle ($\alpha_p$) may be the angle formed by an element of a pitch cone and the bevel gear axis. The pitch angle may be based on the number of pinion teeth of a pinion gear (n) and the number of gear teeth of the mating gear (N) in the expression:

$$\alpha_p = \tan^{-1}(n/N)$$

The pressure angle ($\phi$) may be the acute angle between a common normal of the profiles of two mating gear teeth at a contact point and in a common pitch plane. The pressure angle may be a predetermined constant or ANSI standard, such as 14.5°, 20° or 25°.

Figure 3:
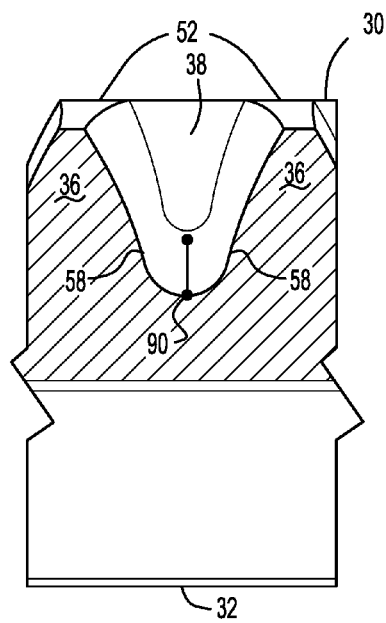
FIG. 3 is a section view of the straight bevel gear of FIG. 1 along section line 3-3.

Referring to FIG. 3, a section view of a true spherical involute gear tooth profile is shown. As can be seen in FIG. 3, a gear tooth 36 having a spherical involute configuration may have a continuously curved and completely non-planar cross section between gear tip surfaces 52 of adjacent teeth. More specifically, the continuously curved cross section may be provided in a section plane 54, such as that shown in FIG. 2. The section plane 54 may extend parallel to but may not intersect the axis 42 and may extend perpendicular to a plane 56 that bisects a gap 60 (which may also be referred to as a gap bisecting plane 56) that is disposed between adjacent gear teeth 36 and that that includes the axis 42 (i.e., includes multiple points on the axis 42 or the entire axis 42). Moreover, the section plane 54 may be spaced apart from and may not intersect any webs that may extend between adjacent gear teeth 36 as will be discussed in more detail below.

The spherical involute surface 58 may provide improved conjugacy and reduce or substantially eliminate transmission error or kickout between two properly mounted and aligned gears having spherical involute tooth configurations. Reduced transmission error may reduce gear noise. Reduced kickout may reduce gear backlash and reduce noise from gear clunking. The spherical involute surface may be manufactured without straight cutting blades which would otherwise result in a tooth that has multiple planar surfaces or octoidal surfaces that approximate, but differ from a true spherical involute configuration. For example, a gear having a spherical involute configuration may be made by forging with a forging die that may be precision cut using a multi-axis CNC (computer numerically controlled) machine tool.

The set of gear teeth 36 may be arranged around the axis 42 in a repeating arrangement in which the members of the set of gear teeth 36 may be spaced apart from each other such that a gap 60 is disposed between adjacent members of the set of gear teeth 36. The gap 60 may receive a gear tooth from another mating gear to facilitate rotation of the gears. In the embodiment shown in FIG. 2, 14 gaps are provided that may each have substantially the same configuration due to the substantially similar configuration of the gear teeth 36. For clarity, only some of the gaps 60 are labeled in FIG. 2.

Figure 4:
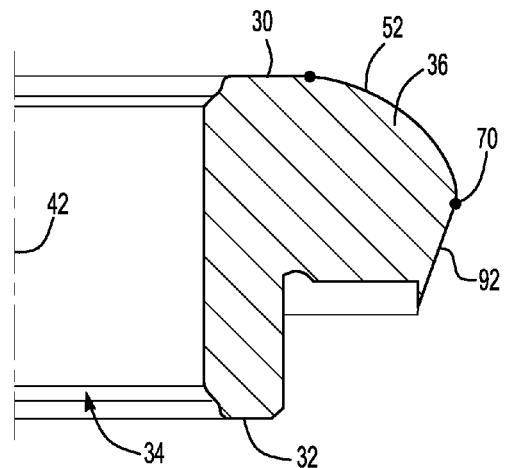
FIG. 4 is a section view of the straight bevel gear of FIG. 1 along section line 4-4 showing a gear tip surface configuration.
Figure 5:
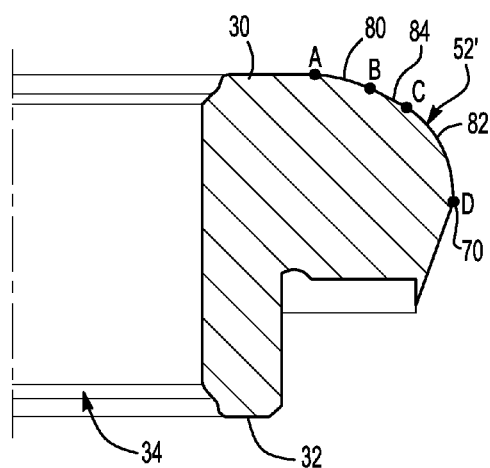
FIG. 5 is a section view of the straight bevel gear along section line 4-4 showing another gear tip surface configuration.

Referring to FIGS. 2-6, each member of the set of gear teeth 36 may have a gear tip surface 52. The gear tip surface 52 may extend from the front surface 30 to an outside diameter 70 of the straight bevel gear 10. The gear tip surface 52 may be completely or partially curved in a direction extending away from the axis 42. Examples of gear tip surfaces are best shown in FIGS. 4 and 5.

In FIG. 4, a gear tip surface 52 is shown that is completely and continuously curved from the front surface 30 to the outside diameter 70. More specifically, the gear tip surface 52 may be disposed in a tooth bisecting plane 50 that may extend radially from the axis 42 and that may bisect a gear tooth 36. As such, the tooth bisecting plane 50 may include the axis 42 (i.e., include multiple points on the axis 42 or the entire axis 42). Such a configuration may reduce or eliminate edges and stress points that may otherwise be present when the gear tip surface has intersecting planar surfaces.

In FIG. 5, a gear tip surface 52' is shown that is partially curved between the front surface 30 and the outside diameter 70 in a tooth bisecting plane 50. More specifically, the gear tip surface 52' may include a first curved portion 80, a second curved portion 82, and a flat portion 84. The first curved portion 80, the second curved portion 82, and the flat portion 84 may be at least partially disposed in the tooth bisecting plane 50. The first curved portion 80 may extend from the front surface 30 to a first end of the flat portion 84 or from point A to point B. The first curved portion 80 may be nonlinear or completely curved. The second curved portion 82 may extend from a second end of the flat portion 84 that may be disposed opposite the first end to the outside diameter 70 or from point C to point D. The second curved portion 82 may also be nonlinear or completely curved. The flat portion 84 may be linear or may extend in a straight line from the first curved portion 80 to the second curved portion 82 or from point B to point C. As such, the flat portion 84 may not be curved.

The first curved portion 80, second curved portion 82 and the flat portion 84 may be provided in varying lengths. For example, the length of the first curved portion 80 from point A to point B may be greater than the length of the flat portion 84 from point B to point C. Likewise, the length of the second curved portion 82 from point C to point D may be greater than the length of the flat portion 84. In addition, the length of the second curved portion 82 may be greater than the length of the first curved portion 80 in one or more embodiments. Providing curved portions that are longer than the flat portion may provide a generally smooth gear profile that may help facilitate gear engagement with a desired clearance to another gear.

Figure 6:
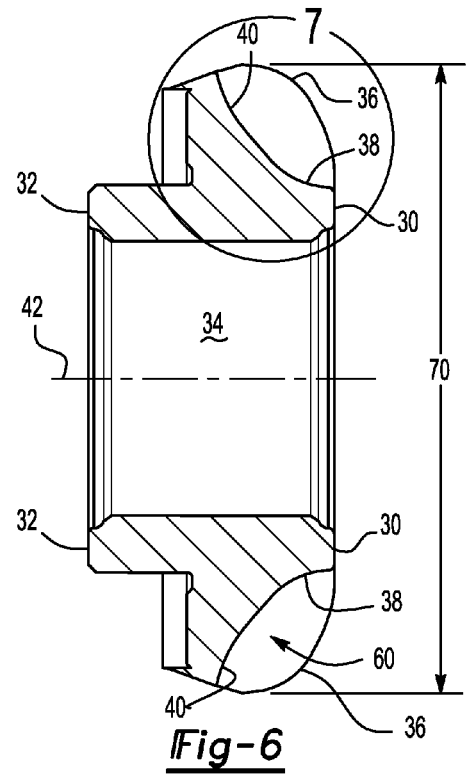
FIG. 6 is a section view of the straight bevel gear of FIG. 1 along section line 6-6.
Figures 7, 8:
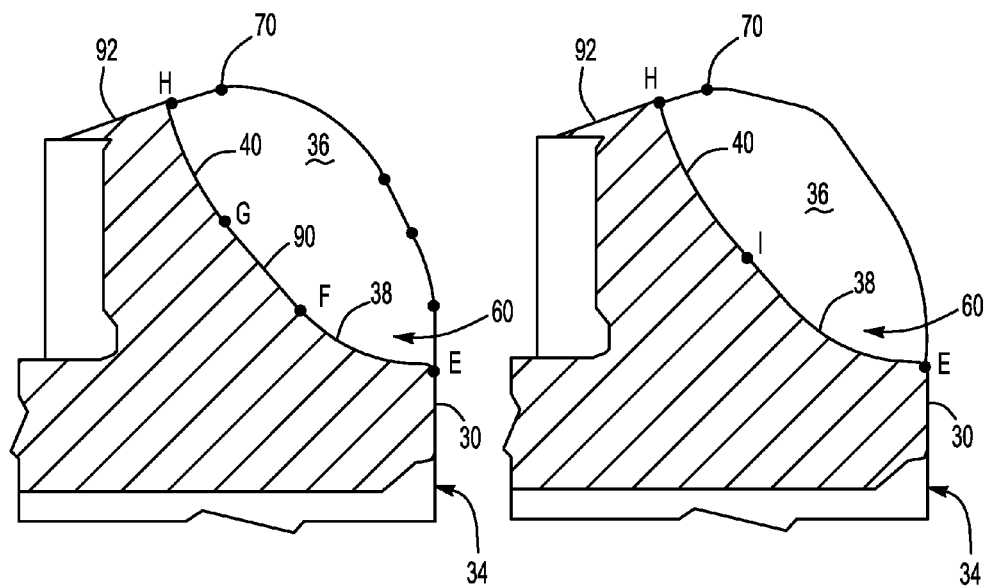
FIG. 7 is a magnified view of a portion of the section view of FIG. 6 showing nonintersecting first and second web surfaces.
FIG. 8 is a magnified view of a portion of another embodiment of a straight bevel gear showing intersecting first and second web surfaces.

Referring to FIGS. 6 and 7, a first web 38 and a second web 40 may extend between adjacent members of set of gear teeth 36. As such, two first webs 38 may extend from each gear tooth 36 such that one first web 38 extends to an immediately adjacent gear tooth 36 in a clockwise direction about the axis 42 and another first web 38 extends to an immediately adjacent gear tooth 36 in a counterclockwise direction. Likewise, two second webs 40 may extend from each gear tooth 36 such that one second web 40 extends to an immediately adjacent gear tooth 36 in a clockwise direction and another second web 40 extends to an immediately adjacent gear tooth 36 in a counterclockwise direction. The first web 38 may be disposed between and may be completely spaced apart from the hole 34 and the outside diameter 70 of the set of gear teeth 36. The second web 40 may be disposed proximate the outside diameter 70 and may extend toward the first web 38.

Figure 9:
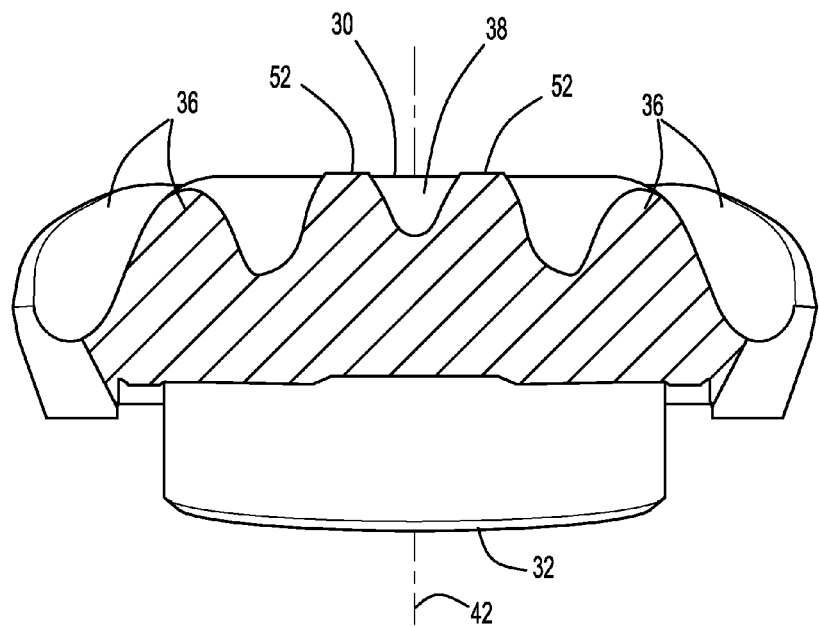
FIG. 9 is a section view of the gear of FIG. 1 along section line 9-9.

Each first web 38 and each second web 40 may be curved in multiple directions such that each first web 38 and each second web 40 is continuously curved or completely curved between adjacent gear teeth 36. Each first web 38 may be continuously curved or completely curved in a direction that extends away from the hole 34, such as in the gap bisecting plane 56. In addition, each first web 38 may be continuously curved or completely curved in a direction that extends substantially perpendicular to the gap bisecting plane 56 as is shown in FIG. 9 or any plane that extends substantially perpendicular to the gap bisecting plane 56 and through the first web 38. Each second web 40 may be continuously curved or completely curved in a direction that extends toward the hole 34, such as in the gap bisecting plane 56. In addition, each second web 40 may be continuously curved or completely curved in a direction that extends substantially perpendicular to the gap bisecting plane 56 or any plane that extends substantially perpendicular to the gap bisecting plane 56 and through the second web 40. As such, each first web 38 and each second web 40 may have a nonplanar configuration and may not have any planar surfaces, linear (i.e., straight line) edges, or straight line segments between the gear teeth 36. The elimination of planar surfaces and intersecting linear edges may reduce points of stress concentration. Examples of first webs 38 and second webs 40 are best shown in FIGS. 7 and 8.

In FIG. 7, a first web 38 is shown that is curved from the front surface 30 toward the outside diameter 70 in the gap bisecting plane 56. More specifically, the first web 38 may extend from the front surface 30 to a first end of a flat segment 90, or from point E to point F. As such, the first web 38 may not include the flat segment 90. The first web 38 may be nonlinear and may be completely and continuously curved not only in the gap bisecting plane 56, but also in any plane that may extend radially from the axis 42 and through the first web 38. For example, the first web 38 may be curved along a constant radius arc or curve (e.g., circular) or an arc or curve having a non-constant radius (e.g., a parabolic curve, polynomial curve, power function curve, or the like) in the gap bisecting plane 56 and/or in a plane disposed perpendicular to the gap bisecting plane 56. Alternatively, the first web 38 may have a constant radius in one or more embodiments.

The flat segment 90 may be substantially linear or may extend in a straight line from an end of the first web 38 to an end of the second web 40, or from point F to point G. As such, the flat segment 90 may not be curved in the gap bisecting plane 56. In addition, the flat segment 90 may be completely disposed in the gap bisecting plane 56 in one or more embodiments. As such, the flat segment 90 may at least partially define the gap 60 and may designate an inflection point of the spherical involute configuration between the first web 38 and the second web 40 as is best shown in FIG. 3. Moreover, the flat segment 90 may be the only linear or substantially linear line segment that is disposed in the gap bisecting plane 56 or that is disposed in the gap 60 or that defines the gap 60 due to the spherical involute configuration of the gear teeth 36 as well as the continuous curvature of the first web 38 and the second web 40. The first web 38 may have a greater length (from point E to point F) than the length of the flat segment 90 (from point F to point G) in the gap bisecting plane 56 to provide a smooth profile and further reduce stress concentrations.

The second web 40 may be curved from near the outside diameter 70 toward the flat segment 90 in the gap bisecting plane 56. More specifically, the second web 40 may extend from an outer surface 92 of the gear body 20 to a second end of a flat segment 90 that may be disposed opposite the first end, or from point H to point G. As such, the second web 40 may not include the flat segment 90. The second web 40 may be nonlinear and may be completely and continuously curved not only in the gap bisecting plane 56, but also in any plane that may extend radially from the axis 42 and through the second web 40. For example, the second web 40 may be curved along a constant radius arc or curve (e.g., circular) or an arc or curve having a non-constant radius (e.g., a parabolic curve, polynomial curve, power function curve, or the like) in the gap bisecting plane 56 and/or in a plane disposed perpendicular to the gap bisecting plane 56. Alternatively, the second web 40 may have a constant radius in one or more embodiments. The second web 40 may have a greater length (from point G to point H) than the length of the flat segment 90 in the gap bisecting plane 56 to provide a smooth profile and further reduce stress concentrations.

In FIG. 8, a first web 38 is shown that is completely and continuously curved from the front surface 30 toward the outside diameter 70. More specifically, the first web 38 may extend along a continuous curve from the front surface 30 to point I, which may be an inflection point where the first web 38 may intersect the second web 40. The second web 40 may then extend from the first web 38 or point I to the outer surface 92 of the gear body 20. As such, no flat segment may be provided and the first web 38 and second web 40 and entire surface that defines a gap 60 may be continuously curved in all directions. For example, the first web 38 may be curved along a constant radius arc or curve (e.g., circular) or an arc or curve having a non-constant radius (e.g., a parabolic curve, polynomial curve, power function curve, or the like) in one or more embodiments. The first web 38 may be disposed in the gap bisecting plane 56 that may extend radially from the axis 42 and that may bisect a gap 60. Such a configuration may reduce or eliminate edges and stress points that may otherwise be present in a configuration having intersecting planar surfaces, such as may be made by a straight cutting tool.

Referring to FIG. 10, straight bevel gear 10' having a pinion configuration is shown. The straight bevel gear 10' may have similar attributes as the straight bevel gear 10. As such, the straight bevel gear 10' may have a gear body 20' that has front surface 30, a back surface 32, a hole 34, a set of gear teeth 36', a first web 38, and a second web 40 as previously discussed. Thus, the members of the set of gear teeth 36' may have a spherical involute configuration as discussed above. The first webs 38 and the second webs 40 may extend between adjacent gear teeth 36 such that each first web 38 and each second web 40 may be curved in multiple directions such that each first web 38 and each second web 40 is continuously curved or completely curved between adjacent gear teeth 36' as previously discussed.

Figure 11:
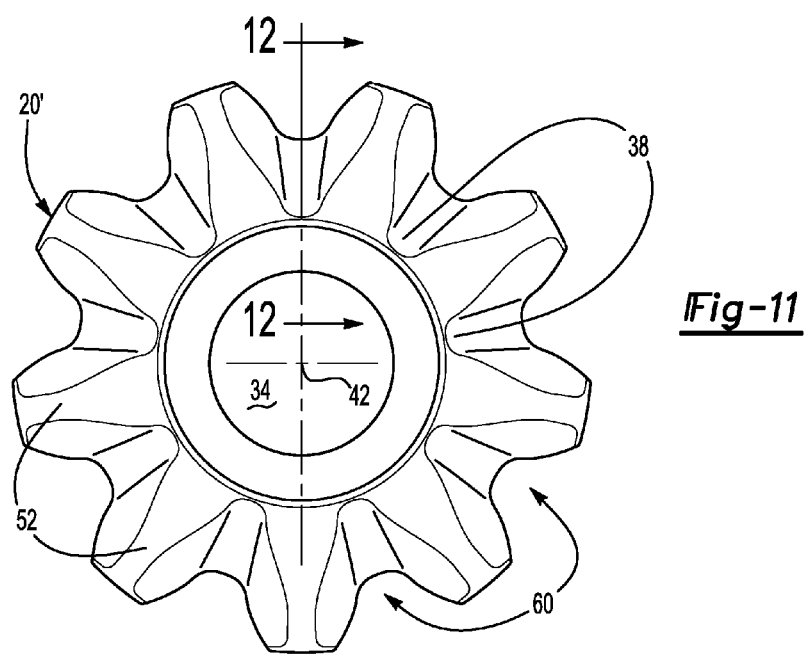
FIG. 11 is a top view of the straight bevel gear of FIG. 10.

Referring to FIG. 11, a top view of the straight bevel gear 10' is shown along with a gap bisecting plane 56.

Figure 12:
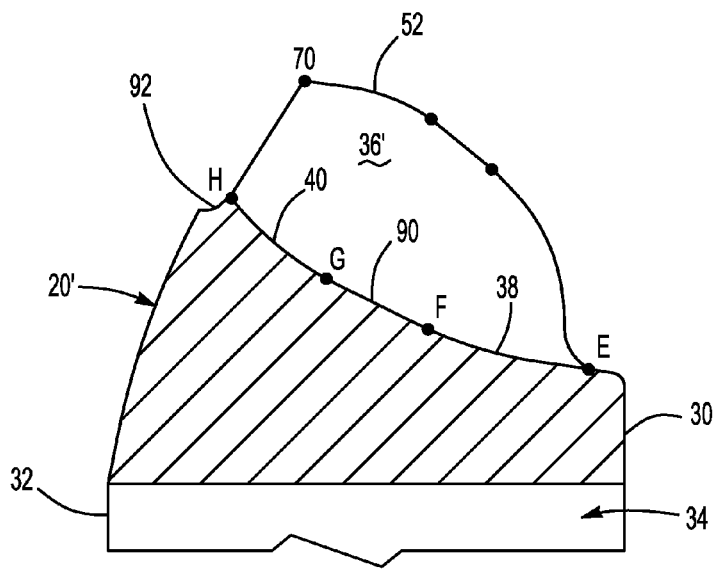
FIG. 12 is a section view of the straight bevel gear of FIG. 10 along section line

Referring to FIG. 12, the first web 38, second web 40, and intervening flat segment 90 are shown that have a similar configuration as that shown in FIG. 7. As such, the first web 38 may be completely and continuously curved from the front surface 30 toward the outside diameter 70 or outer surface 92 in the gap bisecting plane 56 and may extend from the front surface 30 to a first end of a flat segment 90, or from point E to point F. The first web 38 may be nonlinear and may be completely and continuously curved not only in the gap bisecting plane 56, but also in any plane that may extend radially from the axis 42 and may be curved along a constant radius arc or curve (e.g., circular) or an arc or curve having a non-constant radius (e.g., a parabolic curve, polynomial curve, power function curve, or the like). The flat segment 90 may be substantially linear or may extend in a straight line from an end of the first web 38 to an end of the second web 40, or from point F to point G. As such, the flat segment 90 may not be curved in the gap bisecting plane 56 and may be completely disposed in the gap bisecting plane 56 in one or more embodiments. The second web 40 may extend from a second end of the flat segment 90 that may be disposed opposite the first end toward the outside diameter 70 and to the outer surface 92, or from point G to point H. The second web 40 may be nonlinear and may be completely and continuously curved not only in the gap bisecting plane 56, but also in any plane that may extend radially from the axis 42 through the second web 40 and may have a constant radius arc or curve (e.g., circular) or an arc or curve having a non-constant radius (e.g., a parabolic curve, polynomial curve, power function curve, or the like). The flat segment 90 may have a shorter length than the first web 38 and/or the second web 40 in the gap bisecting plane 56.

The spherical involute straight bevel gear configurations discussed above may allow for additional thickness or additional material to be provided between the hole 34 and the first web 38 (i.e., between the hole 34 and the surface of the gap 60 that is closest to the hole 34) which may increase the radial length of the front surface 30 without creating stress risers or edges where stresses may be concentrated. Thus, the continuously curved surfaces of the first web 38 may help distribute stresses in multiple directions to reduce stress concentrations and improve the durability of the gear and increase forging die life.

The spherical involute straight bevel gear configurations previously discussed may also allow gears to be provided with improved conjugacy, reduced transmission error or reduced kick out, reduced backlash, and reduced noise as previously discussed. In addition, the gear root geometry may include full circular or full curved fillets to avoid interference with the tip of a mating gear and reduce stress concentration at the root of each tooth and at the webs, thereby improving gear durability and forging die life. Moreover, the spherical involute straight bevel gear configurations may allow gears to be made with precision forgings, thereby improving gear quality and eliminating electrical discharge machining (EDM) electrodes and associated costs. In addition, gears may be made without producing master gears for quality assessment since the gear tooth surfaces may be inspected by using predetermined coordinates and a coordinate measuring machine. Moreover, the spherical involute straight bevel gear configurations may provide improved gear surface contact behavior, which may in turn improve pressure distribution between the gears and improve surface durability and reduce pitting or scoring of gear tooth surfaces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A straight bevel gear comprising:
    a gear body that includes:
        a hole disposed along an axis;
        a front surface disposed substantially perpendicular to the axis;
        an outer surface that is disposed in a nonparallel and non-perpendicular relationship with the front surface;
        a set of gear teeth arranged around the hole, wherein members of the set of gear teeth are provided with a spherical involute configuration and have a gear tip surface that is continuously curved from the front surface to the outer surface; and
        a first web that is disposed between the hole and an outside diameter of the set of gear teeth, wherein the first web extends between two adjacent members of the set of gear teeth such that the first web is completely curved in a plane that includes the axis and that bisects a gap between the two adjacent members of the set of gear teeth.

2. The straight bevel gear of claim 1 wherein the first web extends along a continuous nonlinear curve between two adjacent members of the set of gear teeth and substantially perpendicular to the plane.

3. The straight bevel gear of claim 1 wherein the first web extends along a parabolic curve in the plane.

4. The straight bevel gear of claim 1 wherein the front surface that extends around and at least partially defines the hole, wherein the first web extends from the front surface.

5. The straight bevel gear of claim 4 wherein the gear tip surface extends from the front surface to the outside diameter, wherein the gear tip surface is nonlinear from the front surface to the outside diameter.

6. A straight bevel gear comprising:
a gear body that includes:
 a hole disposed along an axis;
 a front surface disposed substantially perpendicular to the axis;
 an outer surface that is disposed in a nonparallel and non-perpendicular relationship with the front surface;
 a set of gear teeth arranged around the hole, wherein members of the set of gear teeth are provided with a spherical involute configuration and have a gear tip surface that is continuously curved from the front surface to the outer surface;
 a first web that is disposed between the hole and an outside diameter of the set of gear teeth, wherein the first web extends between two adjacent members of the set of gear teeth such that the first web is completely curved in a plane that includes the axis and that bisects a gap between two adjacent members of the set of gear teeth; and
 a second web disposed proximate the outside diameter, wherein the second web extends between two adjacent members of the set of gear teeth such that the second web is completely curved in the plane.

7. The straight bevel gear of claim 6 wherein the first web extends to the second web.

8. The straight bevel gear of claim 6 wherein the second web extends along a continuous nonlinear curve between two adjacent members of the set of gear teeth and substantially perpendicular to the plane.

9. The straight bevel gear of claim 6 wherein the second web extends along a parabolic curve.

10. The straight bevel gear of claim 6 wherein the first web extends along a first curve in the plane, the second web extends along a second curve in the plane, and the first curve has a curvature that differs from the second curve.

* * * * *